United States Patent [19]

Erath

[11] Patent Number: 5,677,894
[45] Date of Patent: Oct. 14, 1997

[54] HYDROPHONE STRUCTURE WITH CENTER PIN

[75] Inventor: Louis W. Erath, Abbeville, La.

[73] Assignee: Syntron Inc., Houston, Tex.

[21] Appl. No.: 579,327

[22] Filed: Dec. 27, 1995

[51] Int. Cl.$^6$ .................................................. H04R 17/00
[52] U.S. Cl. ........................ 367/160; 367/157; 310/337
[58] Field of Search ............................... 367/157, 160, 367/161, 164, 165, 173; 310/331, 337, 332, 330

[56] References Cited

U.S. PATENT DOCUMENTS

| | | | |
|---|---|---|---|
| 3,187,300 | 6/1965 | Brate | 310/337 |
| 3,749,948 | 7/1973 | Morris | 310/331 |
| 3,988,620 | 10/1976 | McDavid | 367/155 |
| 4,017,824 | 4/1977 | Fife et al. | 367/155 |
| 4,174,503 | 11/1979 | Merklinger et al. | 330/300 |
| 4,446,544 | 5/1984 | Connolly, Jr. | 367/155 |
| 4,464,739 | 8/1984 | Moorcroft | 367/130 |
| 4,509,037 | 4/1985 | Harris | 340/347 |
| 4,709,361 | 11/1987 | Dahlstrom et al. | 367/165 |
| 4,782,910 | 11/1988 | Sims | 367/165 |
| 4,799,201 | 1/1989 | Nelson | 367/41 |
| 4,833,659 | 5/1989 | Geil et al. | 367/155 |
| 4,876,675 | 10/1989 | Ogura et al. | 367/155 |
| 4,926,397 | 5/1990 | Robertson | 367/157 |
| 4,977,546 | 12/1990 | Flatley et al. | 367/140 |
| 5,029,147 | 7/1991 | Andrews et al. | 367/134 |
| 5,051,799 | 9/1991 | Paul et al. | 375/25 |
| 5,193,077 | 3/1993 | Weiglein et al. | 367/23 |
| 5,335,548 | 8/1994 | Kalibjian | 73/655 |
| 5,363,344 | 11/1994 | Sofen | 367/157 |
| 5,394,379 | 2/1995 | Weichart et al. | 367/163 |

OTHER PUBLICATIONS

Piezotronic Technical Data, Brush Electronics Company, 1952, pp. 1–27.
Material Descriptions and Typical Applications, pp. 12–13.
IEEE Standard on Piezoelectricity, Copyright 1978 by The Institute of Electrical and Electronics, Engineers, Inc., pp. 1–55.

*Primary Examiner*—Ian J. Lobo
*Attorney, Agent, or Firm*—Gunn & Associates, P.C.

[57] ABSTRACT

An active element in a hydrophone includes a piezoelectric hydrophone crystal mounted to a backing plate. The piezoelectric crystal may divided into separate segments. If so segmented, the polarities of the segments are oriented in the same direction. Whether or not segmented, the center portion or segment of the crystal is supported in part by a center pin at its center. Thus, in the presence of a downward pressure, the end portions or segments develop a concave flexure and the center segment, due to the center pin support, develops a convex flexure. With this reverse flexing phenomenon, the center portion segment develops an electrical signal of opposite polarity from those of the end segments. By carefully selecting the areas of the end segments, and electrically coupling the segments so that the harmonics of the various segments are added out of phase, the distortion introduced the harmonics of the various phases subtract. The relative strengths of the signals from the segments may tailored by adjusting the areas of the segments.

15 Claims, 2 Drawing Sheets

HYDROPHONE STRUCTURE WITH CENTER PIN

FIELD OF THE INVENTION

The present invention relates generally to the field of hydrophones and, more particularly, to a new hydrophone and to a method and system for mounting a low-distortion hydrophone element in which a center pin supporting a piezoelectric crystal causes a reverse polarity signal from the center portion of the crystal. Reverse flexure of the center portion develops an electrical signal in such a way that the second harmonic distortions from the center and end portions cancel.

BACKGROUND OF THE INVENTION

Piezoelectric transducers for a variety of applications, including hydrophones, are well known. Piezoelectric devices respond to an application of stress, such as externally applied pressure as from a sound signal, to develop an electrical potential. Conversely, piezoelectric devices develop a mechanical response when a voltage is applied. The behavior and characteristics of piezoelectric materials is well described in *IEEE Standard on Piezoelectricity*, 1978, incorporated herein by reference.

The earliest such applications for transducers were entirely analog. With the advent of digital technology, however, digital techniques were soon applied to signal detection and processing. This digital technology, in general, is capable of higher resolution than the previous analog techniques.

The earliest digital signal acquisition and processing data rates were extremely slow, and had fewer bits per sample, compared with the state of the art today. With slow bit rates, distortion produced by the piezoelectric crystals was relatively insignificant. In this context, the term "distortion" refers to the increasing significance of harmonics, particularly the second harmonic, compared to the fundamental of the signal, with increasing signal output.

As stress on a piezoelectric device increases, the amplitudes of the harmonics produced by the crystal increase at a rate that is faster than the rate of increase in the amplitude of the fundamental. Furthermore, as digital signal processing has increased in speed and resolution, the distortion of the signal from the harmonics has become more and more important. The clarity and resolution is thus dependent more and more on the signal from the transducer being relatively undistorted.

In certain applications such as seismic applications, noise from the background and other sources is of much higher amplitude than the return signal of interest. A variety of techniques, such as correlation, have been developed to extract the reflected, desired signal from this background noise. The non-linearity in the signal from the crystal will cause inter-modulation between the background noise and the desired signal. In other words, the desired signal will be amplitude modulated by the much larger noise signal, generating new families of modulation products, complicating the filtering process.

Equipment improvements in data rate, resolution, and linearity bring better definition in resultant profiles, to the point that non-linearity and distortion from the transducer contribute most of the signal error. That means that an improvement in the accuracy of the transducer brings an immediate improvement in signal quality.

A further difficulty lies in the fact that, since there is no perfect transducer, there is no standard against which to measure the distortion from a transducer. This is illustrated in FIG. 10, page 36, in the previously mentioned *IEEE Standard on Piezoelectricity*.

Thus, there remains a need for a method and system to eliminate or at least minimize the effects of signal distortion from the active element in a transducer, such as a piezoelectric device. Such a method and system should eliminate the distortion effects of the piezoelectric device, despite the non-linearity of the element itself. The system should be self-contained and not have to rely on any other signal processing steps or other active elements such as transistors.

A viable solution to these and other problems was disclosed in U.S. Pat. No. 5,541,894, entitled Low Distortion Hydrophone. In this disclosure, a first piezoelectric element is mounted so as to receive a pressure signal. A second piezoelectric element is provided with a means of receiving and enhancing the same pressure signal. Since a piezoelectric element is a capacitor, another capacitor is coupled in parallel with the second element to serve as a divider. The output voltage of the combination of the two elements is taken as the difference between the positive terminals of the two elements. Thus, the effect of the pressure enhancer and capacitance divider is to provide a difference in potential between the fundamentals from the two elements, while rendering the amplitude of the second harmonics equal. The two equal second harmonics cancel each other out at the output terminals, at at least one pressure, while retaining a useful fundamental for further signal processing.

This disclosed improved hydrophone presents at least two draw-backs. First, it calls for distinct capacitive elements in addition to the piezoelectric crystal. Further, it calls for separate structure to enhance the pressure signal on a piezoelectric element. Thus, there remains a need for a hydrophone structure that eliminates the need for such separate elements.

It has also been found that the electrical signal attributable from various regions of a piezoelectric crystal varies according to the degree of stress impressed upon that region of the crystal. The recognition of this phenomenon should provide an opportunity to combine signals from different regions of the crystal to reduce distortion of the signal from higher order harmonics. This feature has been developed in co-pending application Ser. No. 08/545,342, allowed, entitled Segmentation and Polarization in a Hydrophone Crystal, incorporated by reference.

In application Ser. No. _____, piezoelectric crystal segments are mounted upon a backing plate. The crystal segments are mounted with alternating polarity, with end segments of the opposite polarity from the center segment. The pressure sound signal that is empressed upon the crystal segments causes the segments to flex, and thus be stressed, in the same direction, creating electrical signals in opposite directions, depending upon the polarity of the segment.

It has been found that, if the center portion of the crystal could be flexed in a direction opposite to that of the end portions, the various regions of the crystal develop electrical responses to a sound pressure signal of opposite polarity. The second harmonic from the center portion of the crystal subtracts from the second harmonic from the end portions. The portions of the crystal may be segmented to tailor the areas to be stressed in selected directions. Alternatively, the crystal element may simply be mounted to a conductive support member. This feature offers significant simplification and cost savings in the manufacture of such a hydrophone element.

SUMMARY OF THE INVENTION

The present invention employs a piezoelectric hydrophone crystal mounted to a backing plate. The center region of the crystal is supported in part by a center pin at its center. Thus, in the presence of a downward pressure, the end portions develop a concave flexure and the center portion, due to the center pin support, develops a convex flexure. With this reverse flexing phenomenon, the center portion develops an electrical signal of opposite polarity from those of the end portions.

The piezoelectric crystal element may also be scored into segments of selected areas. By carefully selecting the areas of the end segments, and electrically coupling the segments so that the harmonics of the various segments are added out of phase, the distortion introduced the harmonics of the various phases subtract. The relative strengths of the signals from the segments may be tailored by adjusting the areas of the segments.

The present invention thus provides a new hydrophone element and structure, as well as a method of making the hydrophone structure. These and other features of the present invention will be readily apparent to those of skill in the art from a review of the following detailed description along with the accompanying drawings.

DETAILED DESCRIPTION OF A PREFERRED EMBODIMENT

Figure 1:
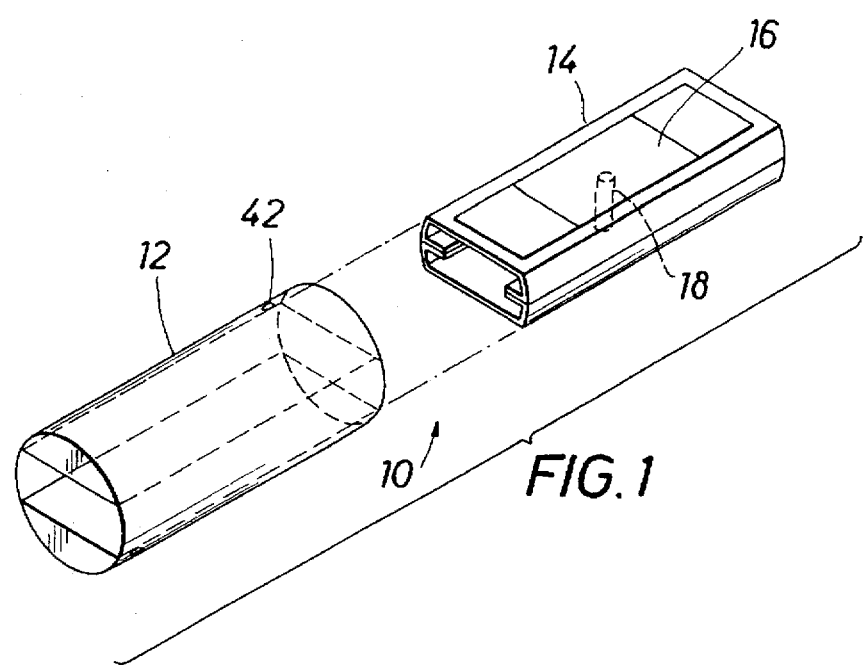
FIG. 1 is a perspective view of a hydrophone casing and mounting structure to which the hydrophone transducer of the present invention may be mounted and also showing the placement of a hydrophone crystal on the mounting structure.

Referring first to FIG. 1, a presently prefered hydrophone structure 10 for enclosing and supporting the present invention is depicted. Those of skill in the art will recognize that many supporting structures for hydrophone elements are possible and fully within the scope of the present invention.

The structure 10 comprises primarily a casing 12 and a support element 14, which holds a piezoelectric crystal element 16 of the hydrophone. The support element 14 is configured to fit within the casing 12 and to support the crystal element 16. Such a piezoelectric crystal element may be acquired from EDO in Salt Lake City, Utah.

The piezoelectric element 16 is placed on the support element 14, which comprises a conductive substrate, preferably by mounting the crystal on the support structure with a conductive epoxy. The element 16 may then be etched to separate the element into at least two and preferably three segments 16a, 16b, and 16c. Alternatively, the element 16 may be mounted to the support structure as a single segment.

The segment 16a may be referred to herein as the end segment or unit under test 1 (UUT-1). The segment 16b may be referred to as the mid segment or unit under test 2 (UUT-2). Segment 16c may be referred to as UUT-3. It should be recognized that UUT-1, 2, and 3 comprise the respective regions of the crystal if the crystal is not segmented.

The crystal element, or each of the segments, are polarized in a predetermined direction by the application of a polarizing voltage, for example 300 VDC. It is known that the application of such a voltage for a sufficient period of time will polarize a piezoelectric material indefinitely. The polarized segments are then individually coupled to outputs to provide an output signal in which the signals from the various segments or portions of the crystal add electrically.

Centered beneath the support structure 14, and thus the element 16, is a center pin 18. The pin 18 may be formed of a substantially rigid post or plate oriented across the axis of the element 16. If a pressure signal is impressed upon the element from the top, then the end segments experience concave flexure and the center portion experiences convex flexure, due to the presence of the center pin 18. If, as in the presently prefered embodiment, the pressure signal is introduced within the support structure 14, then the directions of the flexure of the various portions or segments is reversed. Thus, the center pin is rigidly secured to the underside of the support element 14.

Figure 4:
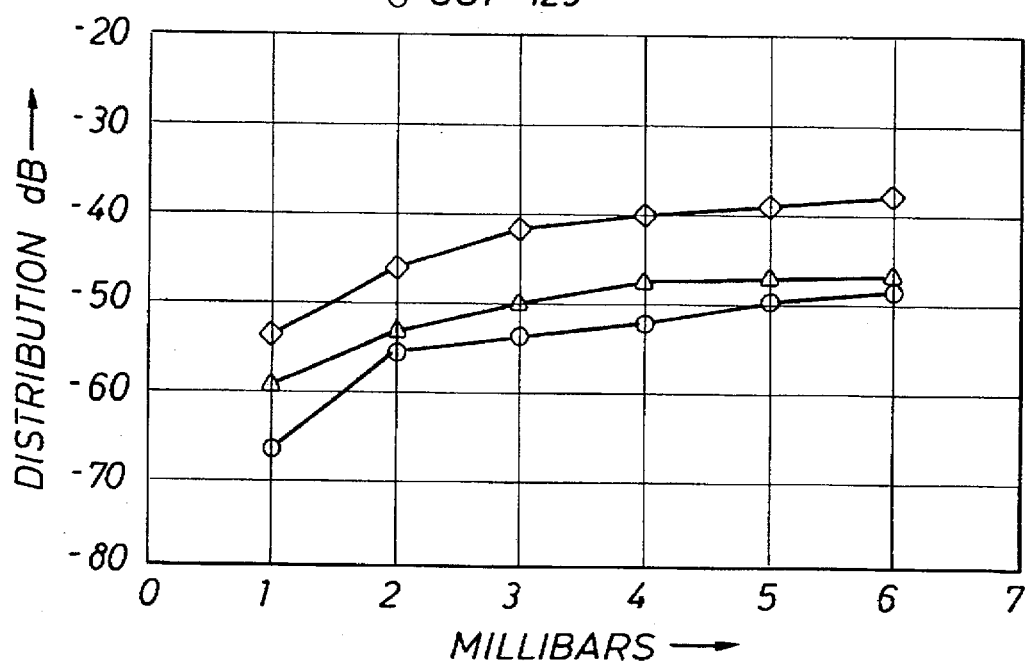
FIG. 4 is a plot of the test results of a segmented crystal element, built in accordance with the present invention, showing distortion vs. pressure.

Application of various pressure signals to the device resulted in the plot shown in FIG. 4. For these tests, the distortion was defined as the fraction of the second harmonic relative to the entire signal from the hydrophone. As shown in FIG. 4, in general, the distortion from the various segments increases with increasing pressure signal.

Measured test results from device are shown below in Table 1.

TABLE 1

| (Device Number 1) | | | |
|---|---|---|---|
| Distortion (MB) | UUT 2 | UUT 1 + 3 | UUT 1 + 2 + 3 |
| 6 | −38 | −45 | −47.5 |
| 5 | −39 | −46 | −49 |
| 4 | −40 | −47 | −52 |
| 3 | −42 | −50 | −54 |
| 2 | −46 | −53 | −56 |
| 1 | −54 | −59 | −66 |
| Capacitance (nf) | 2.0 | 4.92 | 6.52 |
| Sensitivity (V/BAR) | −66 | −59 | −72 |

It has also been recognized that the signals produced by the end and center segments or portions are of opposite polarity from those of the mid segment. This is because the end segments experience flexure in a direction opposite to that of the center segment or portion. If the segments are coupled together as shown in FIG. 2, and the areas of the various segments are carefully controlled so that the second harmonic tends to cancel, significantly reduced distortion results.

It should be appreciated that, in the center segment, the second harmonic is relatively greater than in the end segments (FIG. 4). Thus, while the second harmonics from the center segment tends to cancel out the second harmonic from the end segments, the fundamental from the center segment is relatively less significant and does not cancel out the fundamental from the end segments. The test results, shown graphically in FIG. 4, illustrate significantly reduced distortion when the signals add (180° out of phase).

Figure 2:
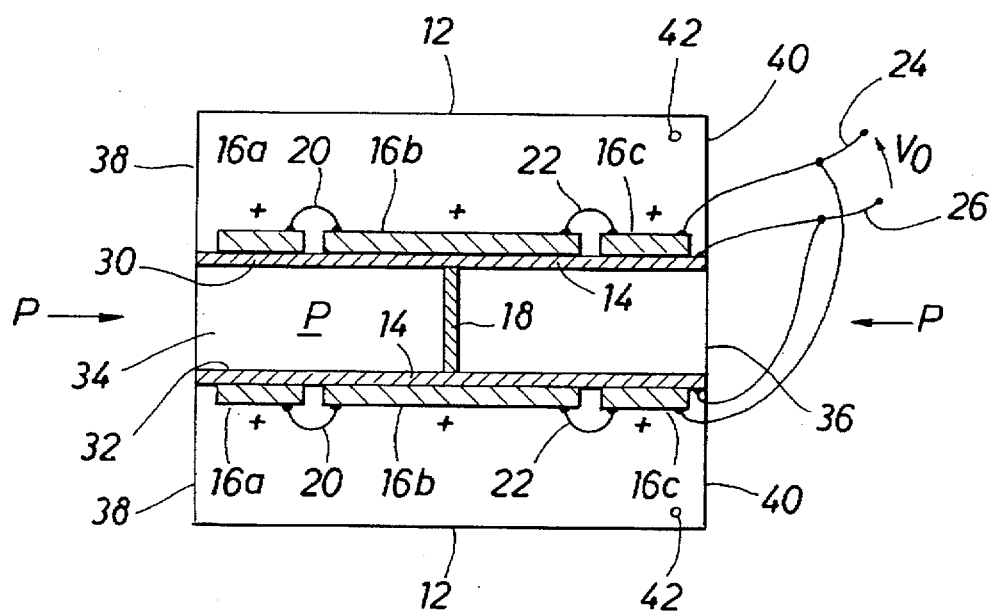
FIG. 2 is a section view of a hydrophone mounting structure adapted to receive the hydrophone element of the present invention.

FIG. 2 depicts a preferred embodiment for the arrangement of the crystal segments. In FIG. 2, the thickness of the crystal element and the etched gaps between the segments are exaggerated for ease of illustration. The segments are coupled by jumpers 20 and 22. One terminal 24 of the transducer is taken from the upper surface of the crystal and the other terminal 26 is taken from the conductive substrate 14. The substrate 14 may also be mounted to and insulated from a separate diaphragm element in a manner known in the art.

As shown in FIG. 2, it is prefered that the pressure signal is conducted within the support structure. The support structure defines an upper wall 30, on which is mounted a set of crystal segments, and a lower wall 32, on which is mounted another set of crystal segments. The segments are then electrically coupled as illustrated in FIG. 2. The sound pressure signal is conducted from outside the hydrophone through openings 34 and 36, into the interior of the hydrophone. When the hydrophone is assembled as shown in FIG. 1, the support structure 14 is preferably sealed to the casing 12 by end-plates 38 and 40. The volume between the casing 12 and the support structure 14 may then be (almost) filled with a fluid, such as oil. To accommodate the sound signal and permit the piezoelectric elements to flex, a small air bubble 42 acts as a cushion. If there is no fluid communication between the chambers above and below the support structure, another bubble 42 acts a cushion to permit flexing of the crystal segments on the underside of the support structure.

It should also be understood that the present invention is equally applicable to a structure in which the piezoelectric crystal is mounted to an electrode which is electrically insulated from the support structure. The advantage of such an arrangement is that a short circuit to the support structure remains insulated from the crystal and its mounting electrode.

Figure 3A:
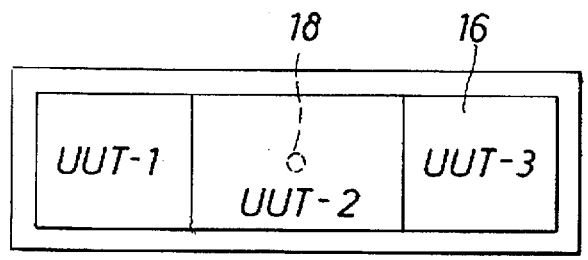
FIG. 3A is a plan view the segmented piezoelectric hydrophone crystal of the present invention showing the placement of the center support pin.
Figure 3B:
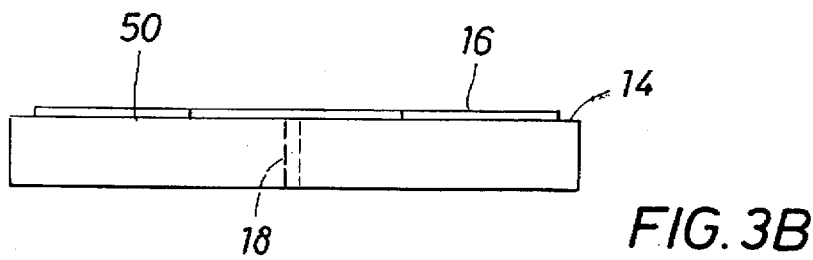
FIG. 3B is an elevation view the segmented piezoelectric hydrophone crystal of the present invention showing the placement of the center support pin.

FIGS. 3A and 3B illustrate an alternative embodiment for a support structure of the present invention. In this case the crystal may or may not be segmented. However, the center segment or portion is still coupled securely to a center pin 18, which is positioned within a cavity 50, as shown.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A hydrophone transducer comprising:
   a. an electrically conductive support element;
   b. piezoelectric crystal on the support element, the crystal defining a plurality of portions, the plurality of portions defining a first plane in contact with the support element and a second plane opposite the support element;
   c. a first output terminal of the transducer electrically coupled to the support element;
   d. a second output terminal of the transducer electrically coupled to the second plane; and
   e. a substantially rigid member in contact with the support element adjacent a first of the plurality of portions.

2. The transducer of claim 1, wherein each of said plurality of portions defines a segment.

3. The transducer of claim 1, wherein the first of the plurality of portions is a center portion.

4. The transducer of claim 2, wherein the first of the plurality of portions is a center segment.

5. The transducer of claim 1, wherein the substantially rigid member is securely attached to the support element at a location proximate the ends of the support element.

6. A hydrophone comprising:
   a. an axially oriented, elongate casing;
   b. an electrically conductive support element within the casing, the support element defining a sound conductive channel through the support element;
   c. a piezoelectric crystal on the support element outside the channel, the crystal defining a first surface in contact with the support element and a second surface opposite the support element;
   d. a first output terminal of the hydrophone electrically coupled to the support element;
   e. a second output terminal of the hydrophone electrically coupled to the second surface; and
   f. a substantially rigid member within the channel in contact with the support element.

7. The hydrophone of claim 6, wherein the casing and the support element define a volume therebetween.

8. The hydrophone of claim 7, wherein the volume is substantially filled with a fluid, except for an air bubble.

9. The hydrophone of claim 6, wherein the support element defines a substantially rectangular cross section with opposed upper and lower walls and opposed side walls between the upper and lower walls.

10. The hydrophone of claim 9, wherein the crystal is mounted on the upper wall.

11. The hydrophone of claim 10, further comprising:
    a. a second crystal mounted on the lower wall outside the channel, the second crystal defining a third surface in contact with the support element and a fourth surface opposite the support element;
    b. wherein the third surface is electrically coupled to the first output terminal; and
    c. wherein the fourth surface is electrically coupled to the second output.

12. The hydrophone of claim 6 further comprising an opening to conduct a sound signal into the channel.

13. The hydrophone of claim 11 wherein the substantially rigid member is between and rigidly attached to the upper and lower walls.

14. A hydrophone comprising:
    a. a substantially cylindrical casing;
    b. an electrically conductive support element within the casing, the support element defining a sound conductive channel through the support element;
    c. a segmented piezoelectric crystal on the support element, the crystal defining a first surface in contact with the support element and a second surface opposite the support element, wherein a first segment of the crystal is polarized in the same direction as that of a second segment of the crystal;
    d. a first output terminal of the hydrophone electrically coupled to the support element;
    e. a second output terminal of the hydrophone electrically coupled to the second surface; and
    f. a substantially rigid member mounted to the support element adjacent the first segment.

15. A method of forming a hydrophone element comprising the steps of:
    a. mounting an elongate piezoelectric element to an electrically conductive support element;
    b. attaching a substantially rigid center pin to the support element opposite the piezoelectric element;
    c. coupling the piezoelectric element to a first output terminal; and
    d. coupling the support element to a second output terminal.

* * * * *